W. F. COCHRANE.
Harvester.
No. 46,183.
2 Sheets—Sheet 1.
Patented Jan'y 31, 1865.
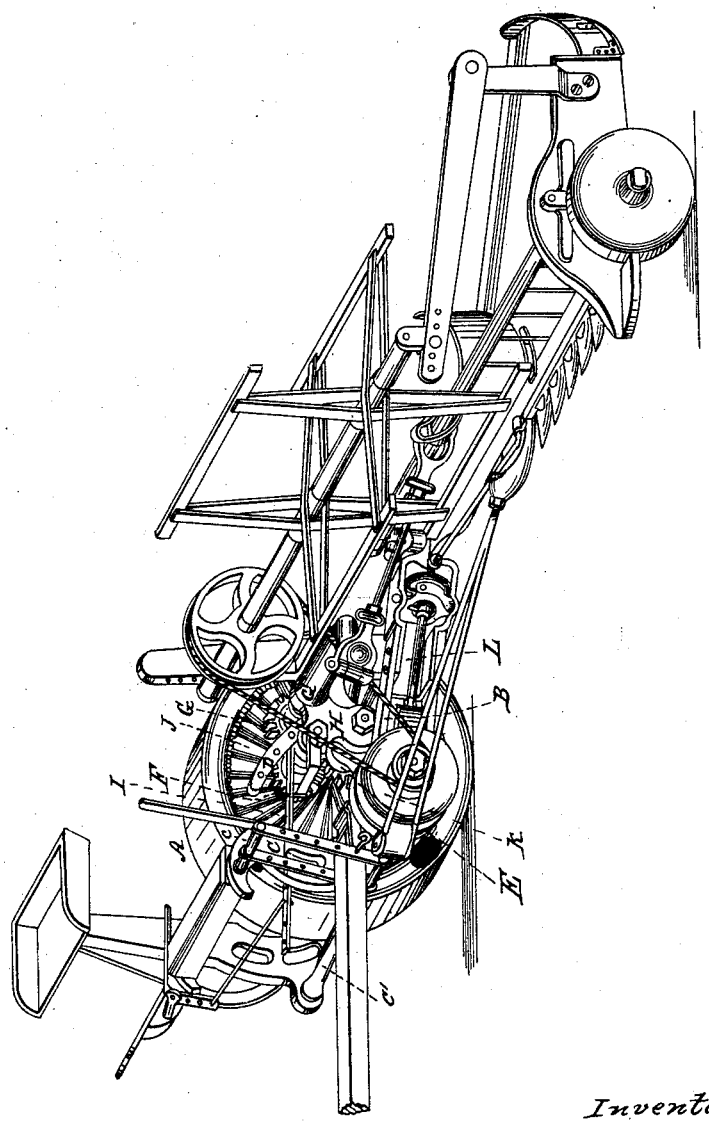

W. F. COCHRANE.
Harvester.
No. 46,183.
2 Sheets—Sheet 2.
Patented Jan'y 31, 1865.
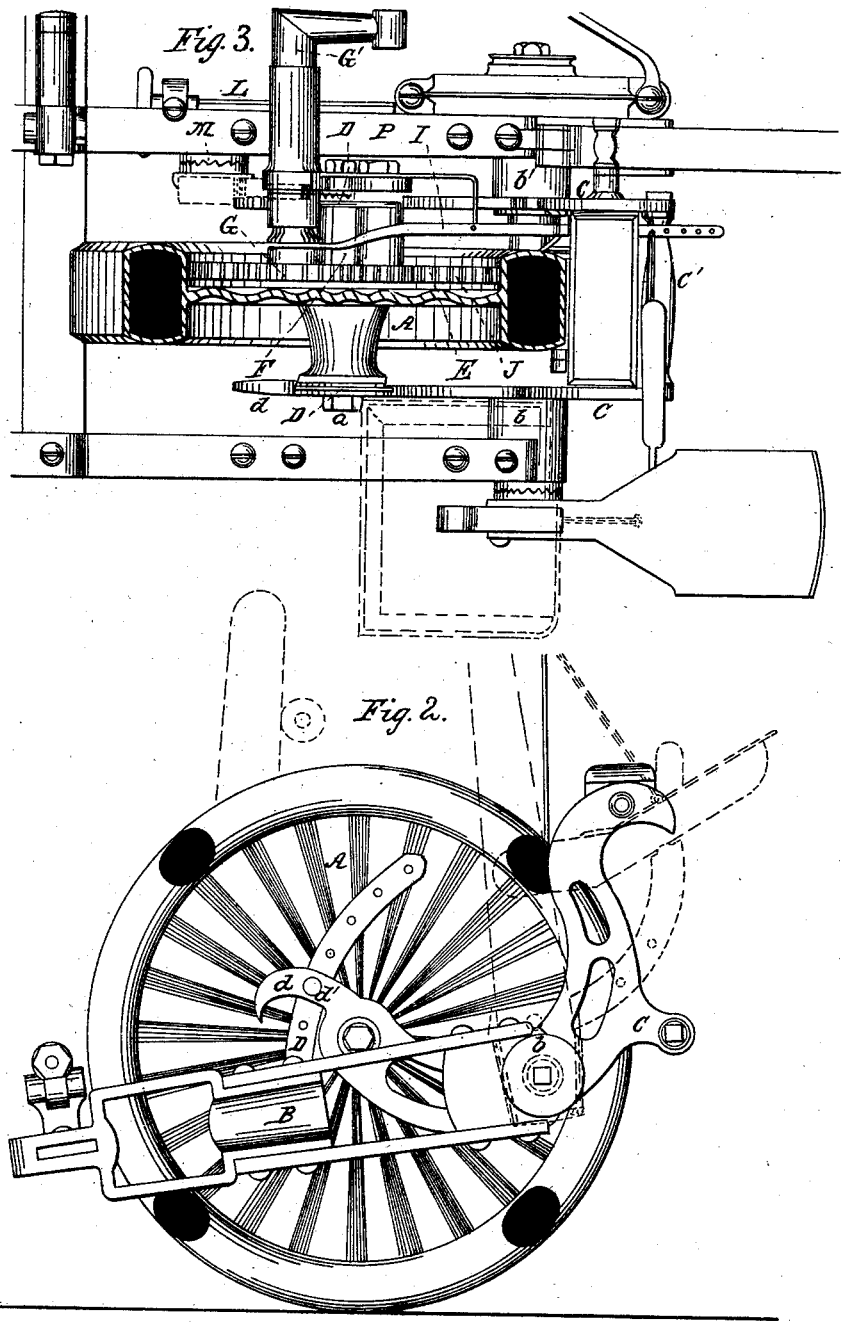

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,183, dated January 31, 1865.

*To all whom it may concern:*

Be it known that I, WILLIAM F. COCHRANE, of Springfield, in the county of Clarke and State of Ohio, have invented a certain new and useful Improvement in Harvesters, of which the following is a full, clear, and exact description, reference being had to the accompanying drawings, which make part of this specification, and in which—

Figure 1 represents a view in perspective of a self-raking harvester embracing my improvement. Fig. 2 represents a view in elevation of the outer or stubble side of the same; and Fig. 3 represents a plan or top view of the main gearing-frame of the same, with the driving-wheel in section.

The improvement herein claimed consists, first, in driving the rake by means of a spur-gear on the hub of the driving-wheel, an idle-wheel, and a spur-pinion on the crank-shaft of the rake, when the whole mechanism is located on the inner side of the driving-wheel, substantially in the manner hereinafter shown; second, in mounting the rake-gearing and crank-shaft in an independent rigid frame or bed-plate so secured to the frame as to admit of their being readily removed or replaced.

In the accompanying drawings, the driving-wheel A is shown as inclosed by a horizontal main frame, B, to which it is connected by a swan-shaped supplementary frame, consisting of two similarly-shaped side pieces, C, of metal, arranged perpendicularly and parallel to each other, and rigidly united by cross-braces $c\ c'$ in front and by the axle $a$ in the rear, on which the driving-wheel loosely turns.

The vertical frame C is pivoted to the main frame B by means of the brackets $b\ b'$, so as to be capable of moving freely vertically. Curved arms D likewise extend upward from the rear of the main frame and pass through slots in the projecting ends $d$ of the pieces C, which extend back of the axle. Pins $d'$ pass through any one of a series of holes in the curved arms D and through these projecting ends, so as to hold the frame at any desired height above the ground. The side pieces, B, the frame C, and the curved arms D thus form two parallel triangular frames, firmly united by the cross-braces and axle, of which the axle of the driving-wheel forms the apex, by which means I secure a strong rigid frame, and one which, while adapted to a self-rake, can readily be raised or lowered.

The driving-wheel revolves loosely on its axis, and carries on its hub a spur-gear, E, which drives an idle-wheel, F, engaging a corresponding pinion, G, on the crank-shaft $G'$ of the rake. This idle-wheel, pinion, and crank-shaft are mounted in bearings in a solid metal frame or bed-plate, H, secured to the inner vertical piece, C, by means of a screw and creased clutch, $h$, (shown in red in Fig. 3,) similar to that which sustains the seat for the driver, as shown at M, Fig. 3. By this arrangement the raking mechanism can readily be detached by simply removing a screw.

The raking mechanism is thrown into and out of gear by sliding the pinion G endwise on its shaft in the usual way, which movement is effected by a compound shifting-lever, I, actuated by the foot of the driver, as shown in the drawings.

By driving the rake in the manner hereinbefore described, I am enabled to locate the crank-shaft which drives the rake in a much better position for working than when the rake is driven directly from a crank on the driving-wheel axle, and can, moreover, vary the speed of the rake at pleasure by altering the relative size of the pinions F and G.

An internally-geared spur-wheel, J, on the driving-wheel drives a spur-pinion on a counter-shaft having its bearings in the bracket $b'$, and carrying on its outer end a bevel-wheel, K, which drives a corresponding pinion on a crank-shaft, L, which vibrates the cutters through a crank and pitman in the usual way.

The bearing of the counter-shaft being within the bracket $b'$, which forms one of the pivots on which the vertical frame C is raised and lowered, it will be observed that the gearing can never become deranged, no matter how much the frame may vary its position vertically. The frame C rocks on the driving-axle, which forms the center of the spur-gear J. Consequently when the frame is raised or lowered the spur-pinion on the counter-shaft merely rolls around the spur-gear J, and is never out of contact with it.

A completely-organized self-raking reaper is shown in the drawings; but it is deemed unnecessary here to describe in detail the other parts of the machine, as they are fully described in five several applications for Letters Patent of the United States by me filed on the 20th day of December, 1864, and respectively marked divisions "A," "B," "C," "D," and "E," and in an application filed simultaneously with this, and marked "F."

It is obvious that my improved machine can readily be converted into a mower by removing the parts not required for harvesting, as in other combined machines.

What I claim herein as new, and desire to secure by Letters Patent of the United States, is—

1. The combination of the spur-wheel E, idle-wheel F, and pinion G with the crank-shaft G', substantially in the manner described, for the purpose set forth.

2. Mounting the rake-gearing in the detachable frame or bed-plate H, as described, for the purposes set forth.

In testimony whereof I have hereunto subscribed my name.

WM. F. COCHRANE.

Witnesses:
WILLIAM MOORE,
MARIAN MOORE.